United States Patent
Golander et al.

(10) Patent No.: US 10,003,645 B2
(45) Date of Patent: Jun. 19, 2018

(54) METHOD AND APPARATUS FOR LOGICAL MIRRORING TO A MULTI-TIER TARGET NODE

(71) Applicant: NETAPP, INC., Sunnyvale, CA (US)

(72) Inventors: Amit Golander, Tel-Aviv (IL); Yigal Korman, Rehovot (IL); Sagi Manole, Petah-Tiqwa (IL); Boaz Harrosh, Tel-Aviv (IL)

(73) Assignee: NETAPP, INC., Sunnyvale, CA (US)

(*) Notice: Subject to any disclaimer, the term of this patent is extended or adjusted under 35 U.S.C. 154(b) by 273 days.

(21) Appl. No.: 14/969,010

(22) Filed: Dec. 15, 2015

(65) Prior Publication Data
US 2017/0171308 A1    Jun. 15, 2017

(51) Int. Cl.
G06F 15/173     (2006.01)
H04L 29/08      (2006.01)
H04L 12/24      (2006.01)
G06F 17/30      (2006.01)

(52) U.S. Cl.
CPC .......... *H04L 67/1095* (2013.01); *G06F 17/30* (2013.01); *H04L 41/20* (2013.01)

(58) Field of Classification Search
CPC ......... G06F 17/30194; G06F 17/30197; G06F 17/302–17/30299; G06F 17/30; G06F 17/30067; G06F 17/30182
See application file for complete search history.

(56) References Cited

U.S. PATENT DOCUMENTS

| | | | |
|---|---|---|---|
| 8,849,764 B1* | 9/2014 | Long | G06F 11/1451 707/646 |
| 9,697,247 B2* | 7/2017 | Vijayrao | G06F 17/30365 |
| 2008/0279005 A1* | 11/2008 | France | G06F 12/0246 365/185.11 |
| 2012/0159097 A1* | 6/2012 | Jennas, II | G06F 3/0611 711/162 |
| 2015/0278243 A1* | 10/2015 | Vincent | G06F 17/30194 707/634 |
| 2016/0179390 A1* | 6/2016 | Guo | G06F 3/061 711/154 |

* cited by examiner

Primary Examiner — Joseph E Avellino
Assistant Examiner — Rachel J Hackenberg
(74) Attorney, Agent, or Firm — Klein, O'Neill & Singh, LLP

(57) ABSTRACT

Logical mirroring of an initiator server running a memory aware file system to a multi-tiered target server by receiving at a first tier of the target server data that was modified at the initiator server and retaining at the first tier of the target server a first subset of the data and moving to a second tier of the target server a second subset of the data to efficiently utilize the multi-tiered target server.

20 Claims, 7 Drawing Sheets

METHOD AND APPARATUS FOR LOGICAL MIRRORING TO A MULTI-TIER TARGET NODE

FIELD

This invention relates to the field of logical mirroring, namely replication of data and metadata from one node to another, typically multi-tiered, node.

BACKGROUND

Due to inherent unreliability of computer systems (from unexpected bugs and power failure to permanent hardware damage), redundancy is employed to assure that data outlives its physical container and remains available. One method for data redundancy is called mirroring, which allows a computer system to automatically maintain multiple copies of data to enable continued processes or quick data recovery even in disaster situations.

RAID (redundant array of independent disks) is a technology that combines multiple disk drive components into a single logical drive for the purposes of data redundancy and/or performance improvement. RAID was designed for a device failure within a server, which is not good enough for many modern clustered systems that require full node redundancy, meaning that data should be available even if the entire server (with the RAIDed disk drives) is inaccessible.

RAIN (redundant array of independent nodes) is a newer technology which similarly to RAID builds a virtual pool of storage devices for redundancy purposes but uses devices located on multiple server nodes, such that in case of a node failure, the lost data is replicated among other RAIN nodes in a cluster to avoid the loss of data from the failed node.

The simplest RAIN version is often implemented with DRBD™, which works in Linux. It is integrated at the block layer, on top of block devices, and mirrors each data block that is written to disk to a peer server node with its own disk drives.

The current solutions enable relatively low latency. However, these solutions are integrated in and designed for block-based storage solutions. In order to work with the current mirroring solutions, a byte-addressable storage media would have to be wrapped with a software layer to simulate a block interface, which is inefficient. Moreover, DRBD™ and similar RAIN solutions were designed with HDD (hard disk drive) and SSD (solid state drive) speeds in mind, and both have much higher write latencies than a high speed network. Finally, the current solutions assume symmetry, i.e. that a persistent device on a source node and on its mirror are of the same type. DRBD™ will not work efficiently, for example, if a first node uses fast SSDs and a second node uses cheaper HDDs.

Thus, there are no efficient mirroring solutions for memory aware file systems and/or for hybrid storage systems, in which, for example, persistent memory (PM) technology (in which a nonvolatile media attached to the central processing unit (CPU) of the computer may provide low RAM-like latencies) is combined with lower cost traditional block-based storage devices (e.g. SSD or HDD).

SUMMARY

Embodiments of the invention provide a system and method for cost efficient mirroring for nodes running a memory aware file system. Mirroring according to embodiments of the invention may be used advantageously in cases where data redundancy is needed and for high availability purposes.

Methods for mirroring, according to embodiments of the invention enable logical mirroring of data and metadata from an initiator node running a memory based file system to a target node. The target node, according to embodiments of the invention, is multi-tiered, typically having a fast access, typically block based storage tier in addition to a less expensive, slower access block based storage tier.

Using a multi-tiered target node enables mirroring of a memory based initiator node while efficiently utilizing the relatively expensive fast access storage tier of the target node. Embodiments of the invention enable to reduce the size of the relatively expensive tier thereby reducing costs and providing a cost efficient system for mirroring memory-based file systems.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

An exemplary system and exemplary methods according to embodiments of the invention will be described below.

Different embodiments are disclosed herein. Features of certain embodiments may be combined with features of other embodiments; thus certain embodiments may be combinations of features of multiple embodiments.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

An exemplary system and exemplary methods according to embodiments of the invention will be described below. For simplicity, Linux semantics are sometimes used to exemplify embodiments of the invention however it should be appreciated that same concepts also apply to other operating systems.

Figure 1A:
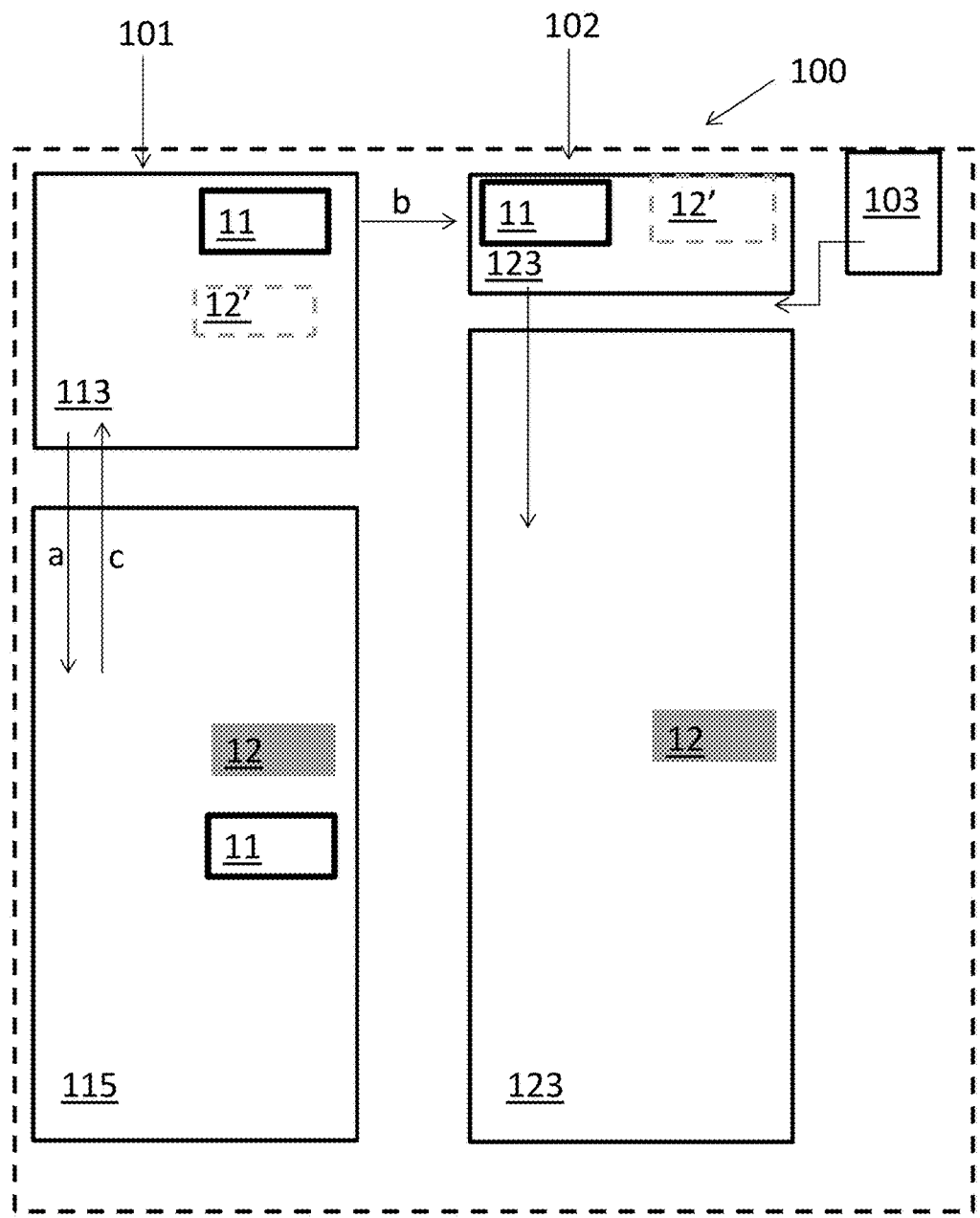
FIGS. 1A and 1B schematically illustrate a system for logical mirroring and components of a system according to embodiments of the invention.

A system according to embodiments of the invention is schematically illustrated in FIG. 1A. The system 100 is typically a clustered system which includes an initiator node, for example initiator server 101, and a target node, e.g., target server 102, for keeping a logical mirror of the initiator node such that data can be recovered from the target node in case of failure or other damage to the initiator server. The system 100 also includes a device 103 for running management software to manage the target node.

In one embodiment the initiator server 101 includes a memory-based file system for managing data as well as metadata at the initiator server 101. The initiator server 101 may keep data (and metadata) on one or more volatile or persistent memory storage type device(s), which may also be referred to as persistent memory (PM) or non-volatile memory (NVM).

The initiator server 101 may include a single tier, or in one embodiment, which is exemplified herein, the initiator server 101 maintains multiple tiers, e.g., a fast access tier 113 (which typically includes the volatile memory or PM) and a slower access tier 115 (which typically includes a block based storage type device or service (e.g., Flash-based SSD; a local device or a remote device such as "NVMe over fabric"). The fast access storage type device (e.g., PM) may be, for example, 1,000 faster per access than the slower access storage type device or service (e.g., SSD or remote device). The fast access storage type devices are typically more expensive than the slower access type devices so, to reduce costs, a full copy of the data (and metadata) of the initiator server 101 is saved on a slower access tier of the initiator server 101 whereas only a part of the data is copied onto the fast access tier of the initiator server 101. Thus, "hot" data (e.g., data accessed multiple times within the past minutes) is typically copied onto the fast access tier (e.g., tier 113) and "warm" data (e.g., data accessed multiple times within the past week) or "cold" data (e.g., data seldom accessed) together with a copy of the hot data are typically stored on the slower access tier (e.g., tier 115). Data is typically written to the fast access tier but may be tiered down (moved to a slower access tier), if and when the faster access tier is about to run out of free space.

The target node, for example, target server 102, is typically a multi-tier device. In the embodiment exemplified herein target server 102 maintains a fast access tier 123 (which typically includes a volatile memory or PM) and a slower access tier 125 (which typically includes a block based storage type device or service).

Although only two tiers are demonstrated in this example, more than two tiers may be maintained by the target node or by the initiator node, according to embodiments of the invention. For example, both initiator and/or target nodes may include one fast access tier and several slower access tiers.

In some embodiments the initiator node maintains a single tier whereas the target node is multi-tiered.

The fast access tiers 113 and/or 123 may typically be located on a memory interconnect (e.g., dual in-line memory module (DIMM), or non-volatile DIMM (NVDIMM)) card or brick over silicon photonics or PCIe or InfiniBand or another, possibly proprietary ultra-low latency interconnect) between the initiator server 101 and target server 102.

Transmission of metadata and data between an initiator node and a target node is typically done in data units (e.g., units of 4 Kb) whereas transmission of data and metadata between tiers within a node is done in blocks (e.g., blocks of 2 MB).

According to one embodiment data from the initiator server 101 (typically, data that has been modified at the initiator server) is received at the fast access tier 123 of the target server 102. The target server 102, however, keeps only a first subset of the data on the fast access tier 123 and another second subset of the data is moved to the slower access tier 125. These two subsets encompass all of the data, thus, the full copy of data from the initiator server 101, which is kept on a single tier at the initiator server, can be divided in several tiers at the target server 102.

This feature and additional features described herein enable to reduce the size of the fast access tier at the target node enabling a cost effective system in which the fast access tier of the target node is of reduced capacity, e.g., the target node fast access tier may be of smaller capacity than the fast access tier of the initiator server. In one example, tier 113 may hold 20% of the capacity of tier 115 whereas tier 123 may hold 4% of the capacity of tier 125.

In the example illustrated in FIG. 1A, a full copy of the initiator server 101 data includes a first subset of the data 11 and a second subset of the data 12. A full copy of the data (including both subsets) is stored at tier 115.

In one embodiment data likely to be accessed is maintained on a fast access tier of the initiator node (in some embodiments data that is likely to be accessed is maintained in the same blocks on the fats access tier of the initiator node to reduce the amount of transmission needed between tiers of the initiator node).

The first subset 11 includes data that is often accessed, in on embodiment, data that is often modified, or that has a high probability of being modified and as such is stored at the fast access tier for low latency. Once the data in the first subset 11 is modified (e.g., by a state modifying operation request such as msync, write, truncate, rename, remove, mkdir, setattr etc.) at the initiator server 101, the modified data is copied to the slower access tier 115 of the initiator server 101 (as demonstrated by the arrow a) and to the fast access tier 123 of the target server 102 (as demonstrated by the arrow b).

The second subset 12 includes data that is seldom accessed (in one embodiment, data that is less often modified) or that has a low probability of being modified. The data is stored in the slower access tier 115 of the initiator server 101. Upon a state modifying operation request to data in the second subset 12 the data is copied to the fast access tier 113 of the initiator server 101 (as demonstrated by the arrow c) and then copied from the fast access tier 113 to the fast access tier 123 of the target server 102, where it is represented as 12'. If the data in subset 12' has a low probability of being modified again, it is moved, based on management software instructions from device 103, from the fast access tier 123 to the slow access tier 125 of the target server 102. Also in the initiator server 101, since the data in subset 12 is seldom accessed it will eventually be moved out of the fast access tier 113 to the slower access tier 115 (as demonstrated by arrow a).

In some embodiments the target server 102 is controlled by the initiator server 101 and the device 103 which runs the management software of the target is not a separate device but rather the initiator server 101.

In some embodiments the system 100 may include a cluster of nodes. Some or all of the data (including metadata) from an initiator server may be mirrored to a first target node and another part or all of the data from the initiator server may be mirrored to a second target node, and so on. A complete copy of the initiator server may then be retrieved by reading all the target nodes.

In other embodiments the system 100 includes a plurality of initiator servers and a single target node, each initiator server controlling management software to manage its data on the single target node.

Mirroring usually includes an initialization phase in which a memory region or block(s) is allocated to an initiator node (typically for the initiator node file system). Blocks may be allocated upon initialization and/or upon demand. In one example blocks of 2 MB are allocated.

The allocation is typically done by management software which may reside at the target or at a different location, e.g., on a device external to the target node.

In a clustered system, a cluster management assigns one or more target nodes per initiator node. Management software (on the target node or elsewhere) then allocates typically large memory regions (in one embodiment, persistent memory in the form of Non-Volatile Dual In-line Memory Module (NVDIMM) or Non-Volatile Random-Access Memory (NVRAM), etc.) for the file system of the initiator node to use during the mirroring process according to embodiments of the invention. This is typically done by providing the file system of the initiator node with target addresses, so the initiator file system can use, for example, efficient remote direct memory access (RDMA) to directly write into the target node's memory or storage media.

As described above, in one embodiment transmission of metadata and data between an initiator node and a target node is typically done in data units (e.g., units of 4 Kb) whereas transmission of data and metadata between tiers within a node is done in blocks (e.g., blocks of 2 MB). Transmission of data units is typically through an interconnect connecting a networking module (such as a network interface card (NIC), host channel adaptor (HCA) and/or other peripherals (e.g., cards, chips or on processor module)) at the initiator node and a networking module at the target node.

High speed network and protocols used according to embodiments of the invention typically support RDMA such as in the case of Infiniband, RoCE and iWarp.

Upon receiving a state modifying operation (e.g., a system call in a file system using a POSIX interface, or a function call in a file system library), the file system of the initiator server 101 may write a log for the operation and send it (typically in network packets) to the target server 102. The initiator server 101 file system may then request confirmation from the target server 102.

After an initialization phase and allocation of memory regions, an operation (e.g. a system call) may be received at the initiator server 101. Some operations (e.g., system calls such as mmap, getattr, close, freeze, read, stat and ls) do not modify the state of the data and metadata and thus do not require any mirroring action. Other operations are state modifying (e.g., system calls such as, msync, write, truncate, rename, remove, mkdir, setattr etc.) In one embodiment, if the operation is a state modifying operation relating to data (e.g., 'write' or 'msync') then the modified data is copied from the fast access tier 113 of the initiator server 101 to the fast access tier 123 of the target server 102 but the metadata and pointers of the data that was modified may be selectively copied from the initiator server 101 to the fast access tier 123 of the target server 102. The selective copying of metadata and/or pointers (examples of which are described below) enables a more efficient process while providing a logical copy of the initiator node on the target node.

Figure 1B:
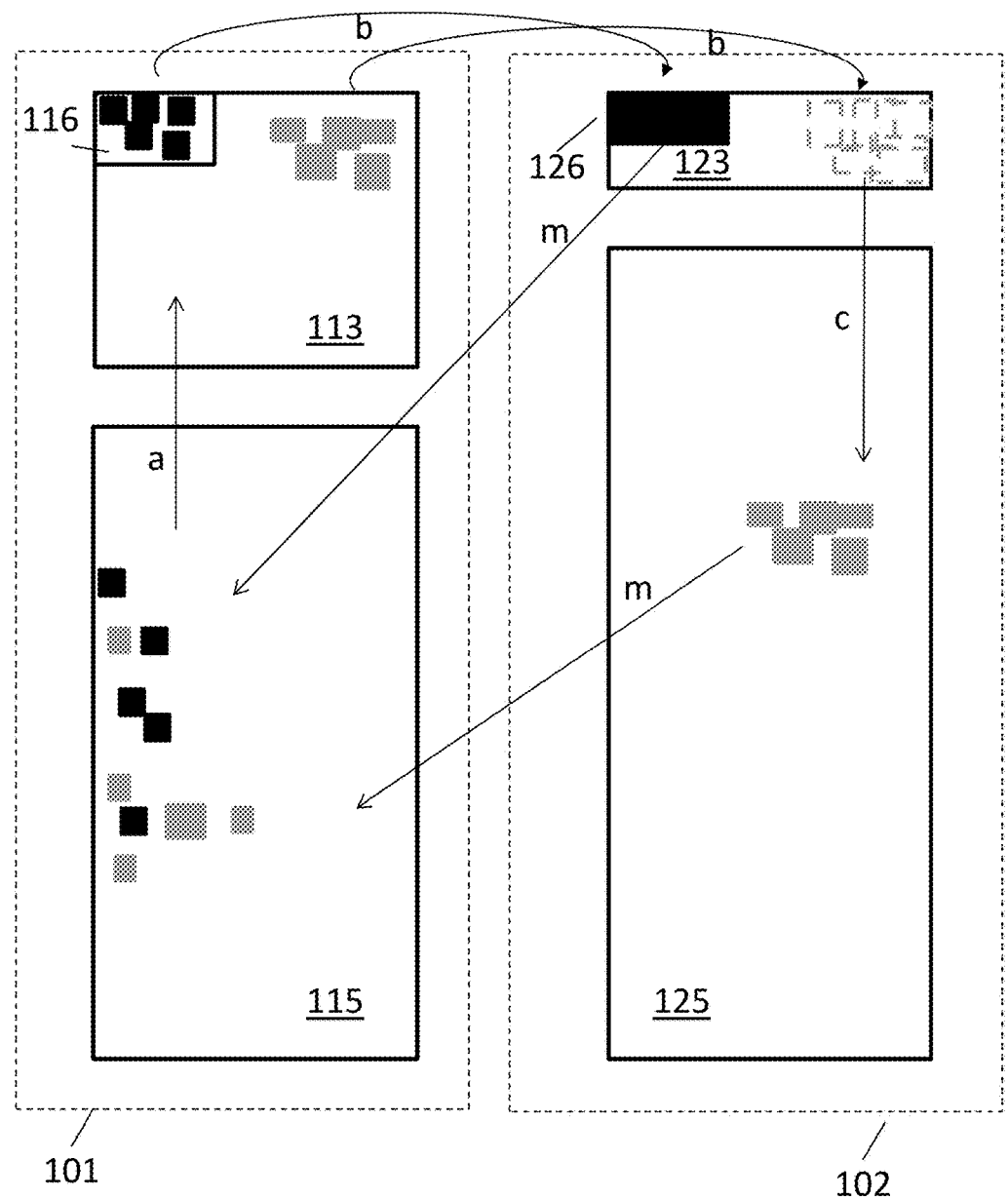

Data (and/or metadata) on the initiator server 101 and/or target server 102 is typically kept in small data units (e.g., units of 4 KB). In one embodiment, which is schematically illustrated in FIG. 1B, data units can be arranged in larger blocks (e.g., blocks of 2 MB). In one embodiment data units from the initiator server 101 are copied to predetermined blocks at the target server 102. In another embodiment data units at the initiator server 101 are kept in specific, predetermined block at the initiator server 101. Data from the predetermined block at the initiator server 101 can be transmitted to the target server 102, possibly to a corresponding block at the target server 102. Thus, identical, corresponding, blocks may be maintained at the initiator server 101 and at the target server 102. However, as further detailed below, corresponding blocks do not have to be maintained on corresponding tiers in the initiator and target servers. For example, a predetermined block maintained in the first tier of the initiator server can be maintained on a second or other tier of the target server.

In the example illustrated in FIG. 1B an initiator node, e.g., initiator server 101, maintains a first tier 113 (typically including fast access and/or high cost memory storage devices) and a second tier 115 (typically including slower access and/or lower cost storage devices). A target node, e.g., target server 102, maintains a first tier 123 (typically including fast access and/or high cost memory storage devices) and a second tier 125 (typically including slower access and/or lower cost storage devices).

In the initiator server 102 data is kept in data units (for example, data having a high probability of being modified is represented by dark boxes and data having a lower probability of being modified is represented by light boxes). The data units are stored in different locations on a storage device in the second tier 115. Some of the data, typically data having a high probability of being modified, is also stored in the memory on the first tier 113. In some embodiments the data or part of the data on the first tier 113 is kept in a predetermined block 116 in the memory of the first tier 113 of the initiator server 101. The block 116 typically stores data units having a probability above a threshold of being repetitively modified.

Upon an access request (e.g., a read or write request) to data at the initiator server 101, the data unit containing the data is moved from the second tier 115 to the first tier 113 (represented by arrow a), if it is not already in the first tier 113, to enable low latency operation. If the access request includes a state modifying operation request (e.g., write) then the data is modified and the copy of that data in the second tier 115 is updated to reflect the modification. A copy of the modified data is also sent to the first tier 123 of the target server 102 (represented by arrows b). The data from block 116 may be sent from the initiator server 101 to a corresponding block at the target server 102. If the modified data has a probability of above a threshold of being modified again (e.g., if the data came from block 116) the data will be retained in the first tier 123 of the target node, typically in a corresponding block 126. In one embodiment a block 126 or blocks are maintained at the first tier of the target server 102 to accept the data from the block 116 or blocks at the initiator server 101.

If the data has a probability below the threshold of being modified again then that data (typically blocks of data) will be moved to the second tier 125 of the target server 102 (represented by arrow c).

Keeping only a subset of the data (namely data having a high probability of being modified again) at the first tier 123 in a predetermined block 126, enables efficient use of target server 102 fast access tier which may be of smaller capacity than the fast access tier of the initiator server 101.

The predetermined block 126 will typically include data having a probability above a threshold of being modified. Thus, most modifications of data are expected to occur at the predetermined block 126 and rarely at the rest of the memory based storage of the target server 102. Thus, it is possible to keep only the predetermined block 126 in the fast access tier of the target server 102 while updating modifications to other data units as needed without slowing down the mirroring process and saving storage space on the fast access, typically expensive, tier of the target server 102.

In one embodiment the system 100 maintains a map or translation table which correlates data units from the target server 102 to locations on the slow access tier at the initiator server 101, since the slower access tier at the initiator server retains a full copy of the data. For example, data units kept in block 126 and data units kept at the second tier 125 of the target server 102 can be mapped to their original locations on the second tier 115 of the initiator server 101, based on the map or translation table (mapping represented by arrows m).

When there is a need or demand for reconstruction of an initiator server (e.g., upon failure or damage to the initiator server) a new initiator may be appointed. The new initiator may be a new node or the target server 102 or even the original initiator server 101. Data units are copied from the target server 102 to locations on the slower access tier of the new initiator based on the map. Metadata and pointers may then be updated according to the location of the data in the new initiator server. The file system of the new initiator may then be checked and made ready for operation.

In some embodiments the map or translation table is stored on the target server 102. A copy of the map may also be kept at the initiator server 101, for example in a cache at the initiator server 101.

A method for logical mirroring between an initiator node and a multi-tier target node, according to one embodiment, may include receiving at a first tier of the target node data that was modified at the initiator node. Based on management software instructions, a first subset of the data is retained at the first tier of the target node and a second subset of the data is moved to a second tier of the target node. The first subset includes data having a probability above a threshold of being modified whereas the second subset includes data having a probability below the threshold of being modified. The method enables obtaining a logical copy of the initiator node on the target node.

Figure 2:
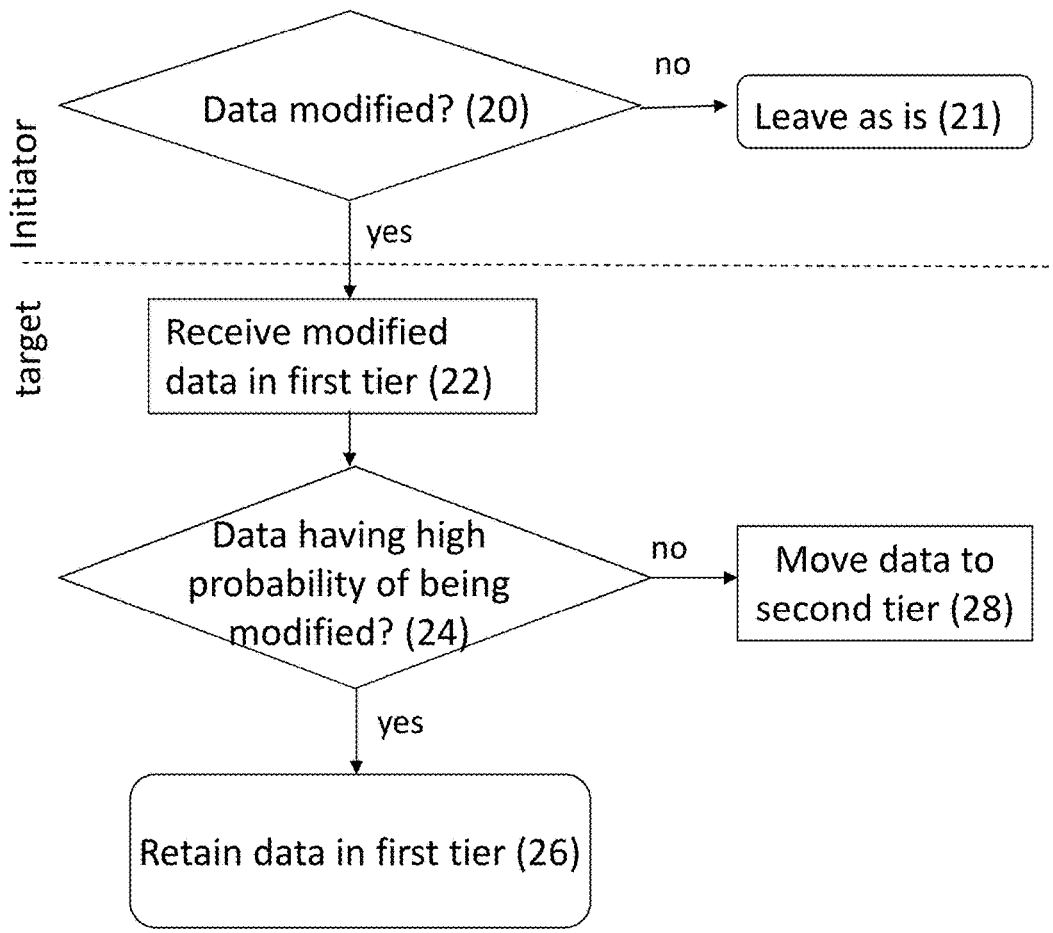
FIG. 2 schematically illustrates a method for logical mirroring to a multi-tier target node, according to embodiments of the invention.

One example of a method for logical mirroring between an initiator server and a multi-tier target node, according to an embodiment of the invention, is schematically illustrated in FIG. 2.

If data was modified at an initiator node (20), for example, following a state modifying operation (as exemplified above) being received at the initiator node, the modified data is copied to a target node and received at a first tier of the target node (22). If the data was not modified at the initiator node it is left as is (21).

If the copied data or part of the copied data (e.g., a first subset of the data) has a probability above a threshold of being modified (i.e., modified again) (24) then the copied data or the first subset of data is retained at the first tier of the target node (26). If the copied data or part of the copied data (e.g., a second subset of data) has a probability of below the threshold of being modified (i.e., modified again) (24) then the data or the second subset of data is moved to a second tier of the target node (28).

Typically, management software instructions control movement of data between tiers at the target node. The management software may be run by a device external to the target node. For example, the device external to the target node can be the initiator node.

In one embodiment the management software can manage a plurality of target nodes, for example in a clustered system having several target nodes for a single initiator node.

In one embodiment the initiator node may also be multi-tiered. The multiple tiers of the initiator node are typically managed by management software that is different than the management software managing the target node.

Thus, a multi-tiered initiator node may run management software with instructions to manage movement of data between the initiator node tiers and separate software with different management instructions to manage movement of data in between tiers of the target node. Thus, in one embodiment data (e.g., data units or blocks of data) may be kept at different locations, i.e., different tiers, in the initiator node than at the target node.

In one embodiment a first tier (typically a fast access tier) of the initiator node includes a predetermined block or blocks for maintaining data having a high probability of being modified (a high probability of being modified may be determined based on a threshold as described herein) and a first tier of the initiator node (typically a fast access tier) includes a corresponding predetermined block for maintaining the data having a high probability of being modified. Since mirroring includes copying only data that was modified from an initiator node to a target node, there is an advantage in keeping data that is likely to be modified in the same blocks. The advantage includes being able to reduce the size or capacity of the fast access, expensive, tier at the target node and to reduce transmission of blocks between tiers at the target node.

In some embodiments keeping data having a high probability (e.g., a probability above a threshold) of being accessed at a first tier of the initiator node is advantageous, as described above. A high probability of being accessed may be determined based on a predicted access pattern (e.g., as further described below).

Controlling a target node with software run by another, typically external, device enables maintaining a target node with a relatively degraded, low maintenance and low cost file system. Additionally, a memory aware file system (e.g., the file system of a multi-tier initiator node) can differentiate between a read access request and a state modifying operation request (such as write), thus, such a file system may control a multi-tier target node such that only data having a high probability of being modified (e.g., written to) will be retained in a first, expensive, tier of the target node as opposed to the first (and expensive) tier of the initiator in which data having a high probability of being accessed (e.g., both read and/or written to) is maintained.

The threshold of probability of data to be modified may be based, for example, on the state modifying operation used to modify the data at the initiator server. For example, an msync( ) system call may be more likely to modify data compared to a write( ) system call (unless the msync is due to file close( ) which lowers the probability for future modifications to the data).

In another embodiment the threshold may be determined based on hints provided, for example, by a file name extension or arguments appended to access requests. For example, file name extensions implying an "append" pattern (such as the extension ".log") may typically indicate that items or data units are to be added sequentially into the file. Thus, if a file has a pre-determined file name format (such as a file having a ".log" name extension) it may be determined that the data in that file has a probability of above the threshold of being repeatedly modified. In another example, an open request which includes an append argument will cause a file to be opened in append mode in which each new data unit accessed (e.g., based on a read or write system call) will typically be added to the end of the file. Thus, operations having specific arguments (e.g., "append") may be a hint to consider data above the threshold.

In one embodiment the threshold of probability is based on an access pattern or a predicted access pattern to the data at the initiator node. Data having specific access patterns may have a higher probability of being modified.

An access pattern may be deduced or predicted based on a history of accesses to the data. A history of accesses may include a limited number of latest events in a file, such as read or write accesses and their associated arguments, such as offset, I/O size, etc. The analysis of a short history of accesses may provide hints of predicted access patterns. In one example a short history of accesses per file may include a table of the last number (e.g. 4) of accesses per file where each table line may record events or parameters such as a coarse grained timestamp for file open request, the flags used for opening the file (e.g. append), a counter for the number of times the file received read access requests, a counter for the number of times the file received write access requests, up to N or all offsets used during I/O accesses and up to N or all I/O sizes used during I/O accesses.

Other methods may be used to determine access patterns or predicted access patterns.

The threshold of probability of data to be modified may be determined based on one or more of the above parameters or based on other such parameters.

Figure 3:
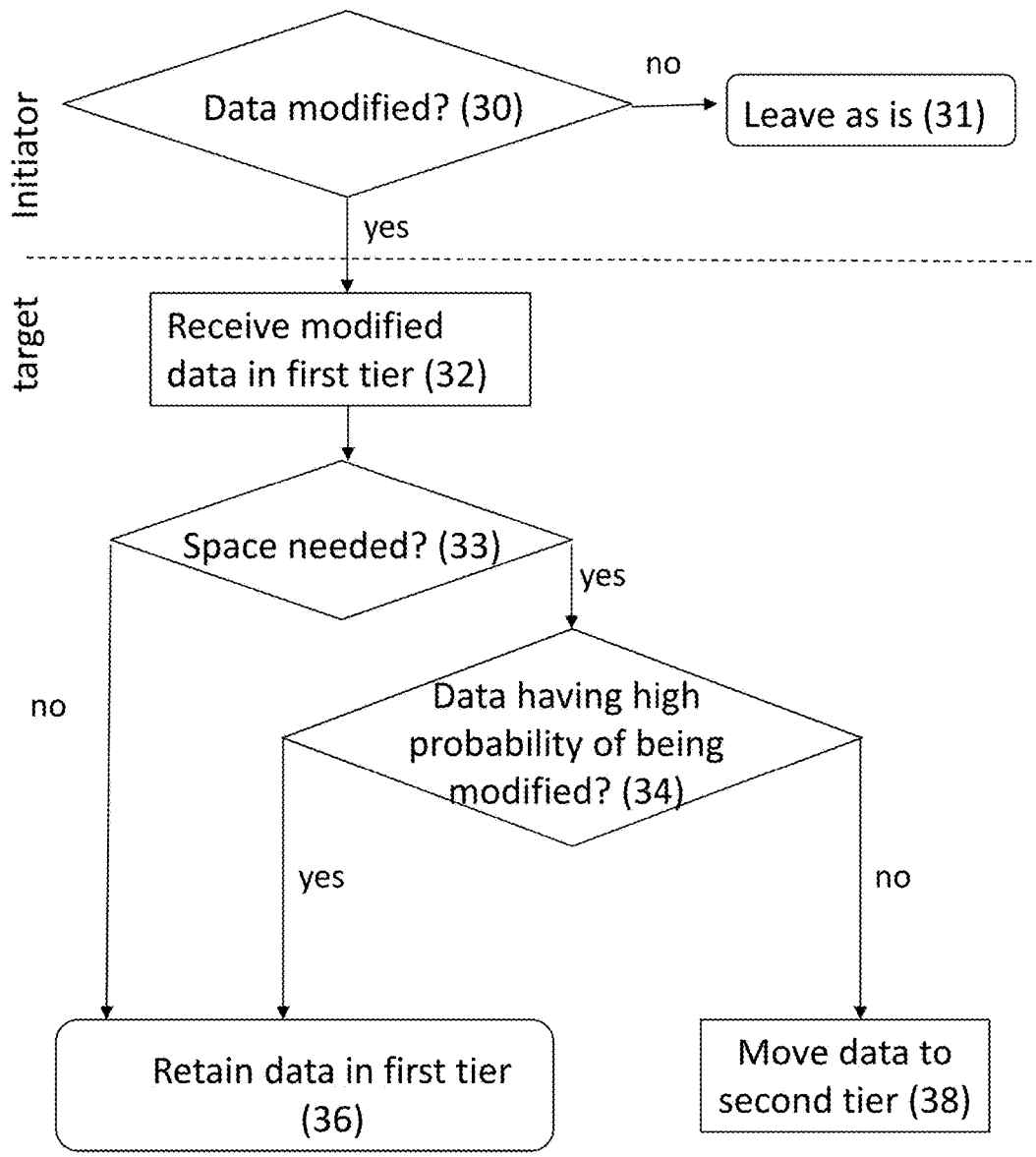
FIG. 3 schematically illustrates a method for logical mirroring according to another embodiment of the invention.

In some embodiments, for example, as schematically illustrated in FIG. 3, moving data from the first tier (typically a fast access and relatively expensive tier) of a target node to the second tier (typically a slower access and less expensive tier) of the target node is done when space is needed on the first tier of the target node.

In one embodiment if data was modified at an initiator node (30), the modified data is copied to a target node and received at a first tier of the target node (32). If the data was not modified at the initiator node it is left as is (31).

While there is no need for space on the first tier of the target node (33) the data is retained at the first tier of the target node (36). If space is needed on the first tier of the target node (33) it is determined if the data or part of the data (e.g., a first subset of the data) has a probability above a threshold of being modified (i.e., modified again) (34). If the probability is above the threshold (34) then the copied data or the first subset of data is retained at the first tier of the target node (36) however if the data or part of the data (e.g., a second subset of data) has a probability of below the threshold of being modified (i.e., modified again) (34) then the data or the second subset of data is moved to a second tier of the target node (38) to free space on the first tier of the target node.

Figure 4:
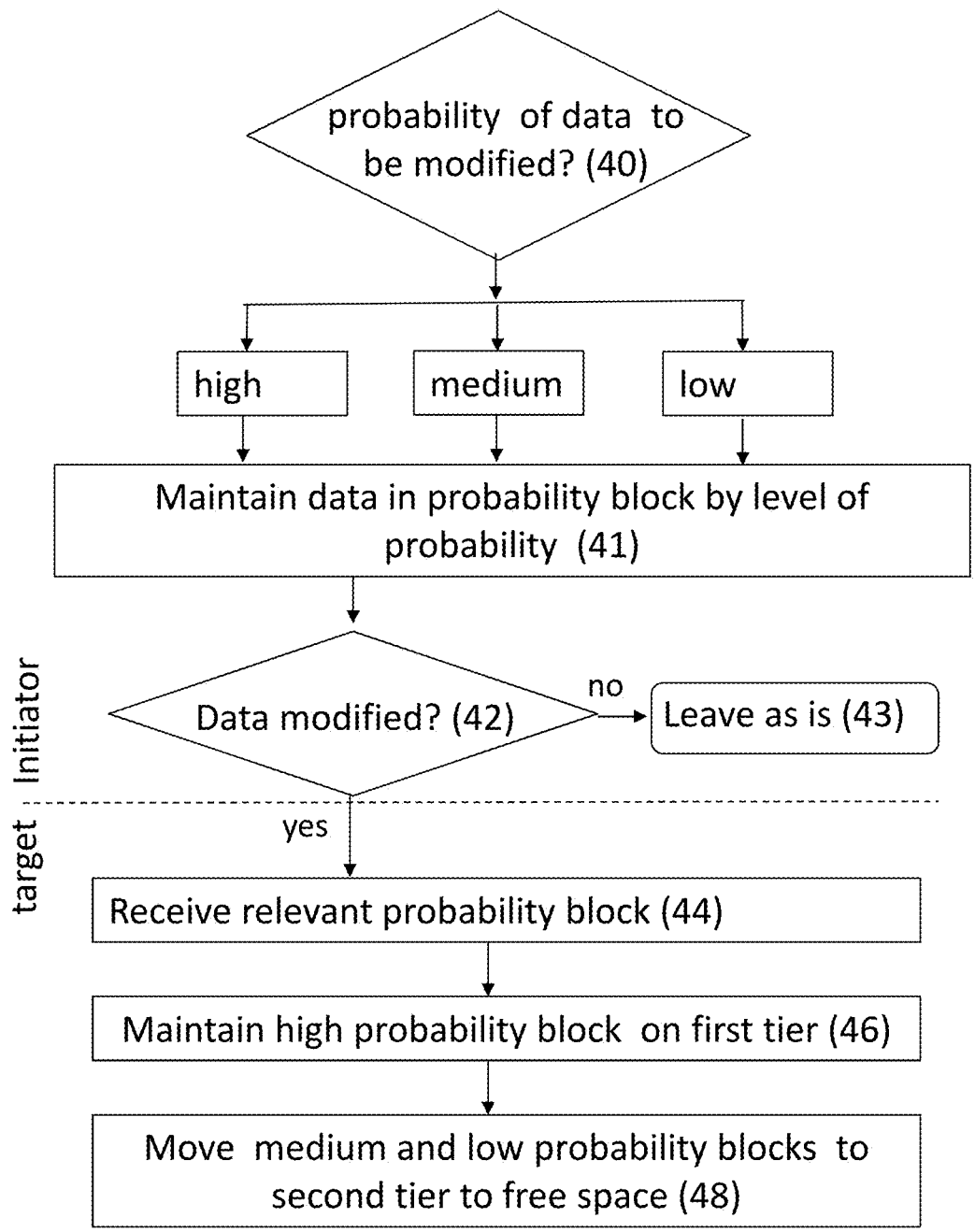
FIG. 4 schematically illustrates a method for logical mirroring based on level of probability of data to be modified.

In one embodiment, which is schematically illustrated in FIG. 4, a method for logical mirroring includes maintaining data in blocks at an initiator node. In one embodiment data having a probability above a threshold (as described above) is maintained in a predetermined block at the initiator node. A corresponding block may be maintained at the first tier of the target node to accept the predetermined data from the initiator node.

There may be different blocks for different probabilities, e.g. high probability, medium probability and low probability. Typically, a high probability block at the initiator node includes the first subset of data described above (i.e., the data at the target node that has a high probability of being modified). Upon a state modifying operation request to a data unit (and/or to metadata) stored in the block at the initiator node the data is transmitted to the target node, optionally to a corresponding block at the target node.

Different blocks are maintained at the fast access tier of the initiator node to accommodate for the different levels of probability of data being modified at the initiator node (40) (e.g., high—a probability above a first threshold, medium—a probability below the first threshold but above a second threshold and low—a probability below the second threshold). Data or data units are maintained, typically at the fast access tier of the initiator node, in probability blocks at the initiator node based on the level of probability of the data (41).

Upon modification of the data (e.g., by receiving a state modifying operation request, as exemplified above) (42) data from the relevant probability block (in which the modified data is kept) is transmitted to the target node and is received at the fast access tier of the target node (44). If data is not modified (42) it is left as is (43).

The probability blocks corresponding to the probability blocks at the initiator node may be retained at the fast access tier of the target node or moved to the slower access tier of the target node according to their level of probability. For example, the high probability block may be maintained at the fast access tier of the target node (46) while the medium and/or low probability blocks are moved to the slower access tier of the target node (48) to free space on the fast access tier of the target node. In some embodiments the medium probability block is moved to a first slow access tier and the low probability block is moved to a second slow access tier of the target node.

Figure 5A:
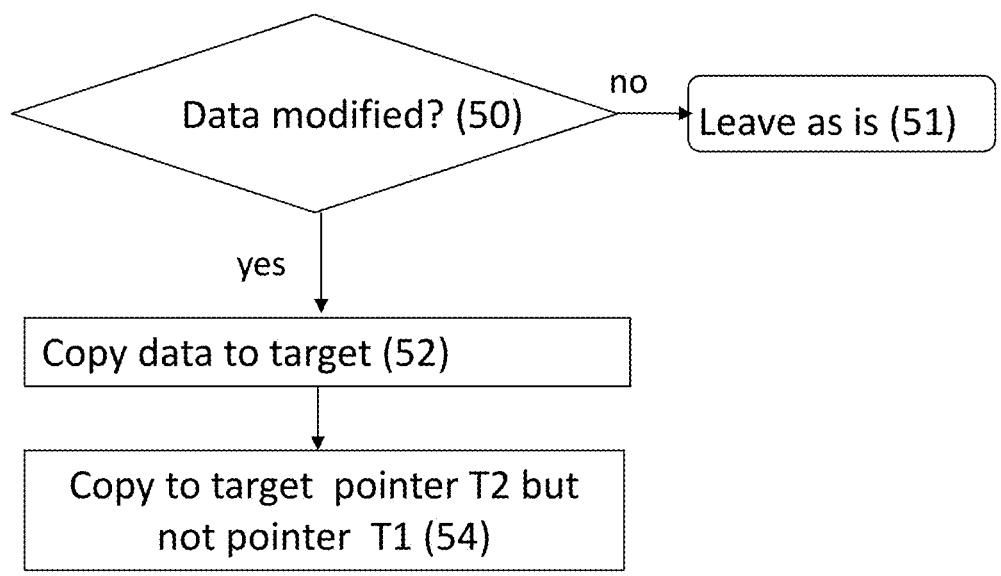
FIGS. 5A and 5B schematically illustrate methods for logical mirroring by selectively copying metadata and pointers of modified data, according to embodiments of the invention.
Figure 5B:
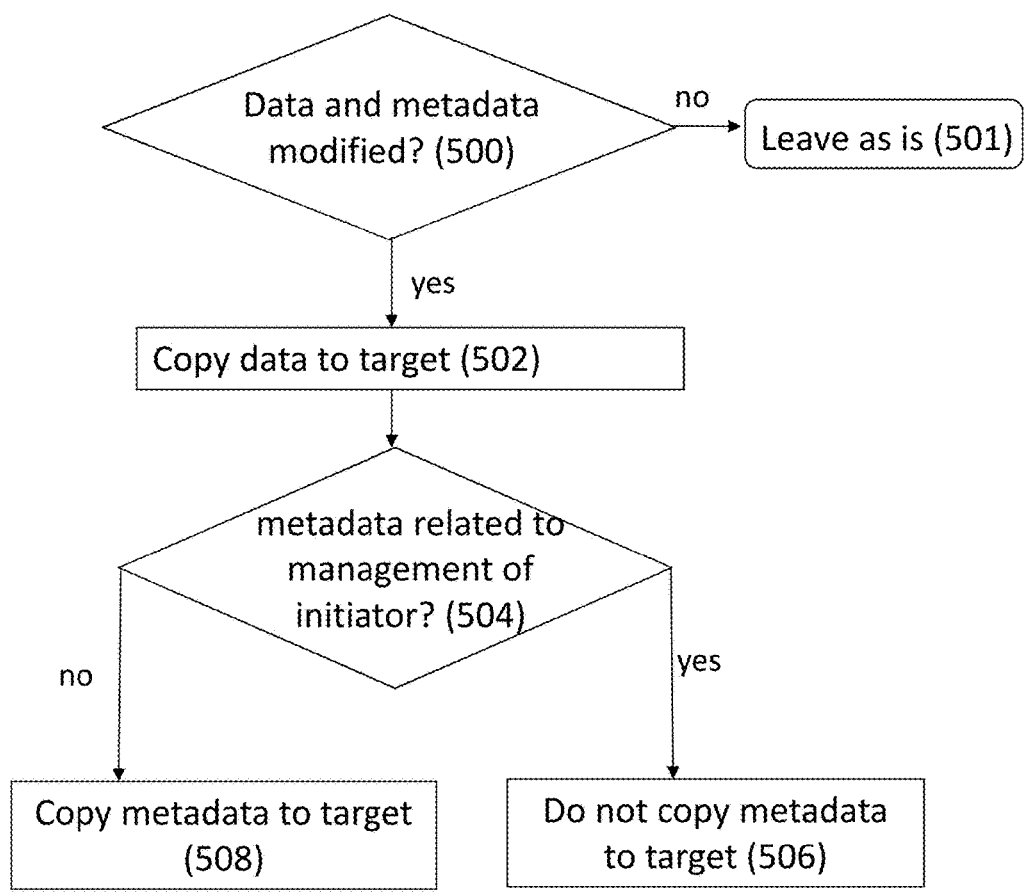

In some embodiments, examples of which are schematically illustrated in FIGS. 5A and 5B, efficient use of a multi-tier target node is made by selectively copying from an initiator node to the fast access tier of the target node metadata and pointers of modified data.

Logical mirroring according to embodiments of the invention provides a typically partial copy of the initiator node on the target node however the information in the "partial copy" can be used, when needed, to start a new initiator node using the memory of the target node. Since not all the information needs to be copied from the initiator node to the target node to enable recovery of the initiator node when needed, methods according to embodiments of the invention enable selective copying of information.

At the initiator node data may be kept in a structure (e.g., inode) describing a file or directory. The structure includes a tree-like configuration having pointers to parts of the data that is included in the file or directory. The pointers may be used to calculate pointers or block numbers pointing to a data unit. In a multi-tier initiator node each data unit has two (or more) pointers each pointer pointing to a location of the data unit at one of the tiers of the initiator node. Thus, as illustrated in FIG. 5A, in one embodiment if data was modified at a multi-tiered initiator node (50), the modified data is copied to a target node (52). If the data was not modified at the initiator node it is left as is (51).

A pointer (T2) pointing to a location of the data unit at a slower access tier of the initiator node (as explained above, the slower access tier is typically the tier which maintains a full copy of the data) is copied to the target node but pointers (e.g., T1) pointing to other tiers of the initiator are not copied to the target node (54).

In another embodiment, schematically illustrated in FIG. 5B, selectively copying metadata includes copying metadata that relates to the data but not copying metadata that relates to management of the initiator node.

In one embodiment if data and/or metadata were modified at an initiator node (500), the modified data is copied to a target node (502). If the data was not modified at the initiator node it is left as is (501). If the modified metadata relates to management of the initiator node (504) (e.g., metadata relating to moving data between tiers at the initiator node, time stamps management queues, performance keeping data, etc.) then that metadata is not copied to the target node (506). Modified metadata that does not relate to management of the initiator node (504) is copied to the target node (508).

What is claimed is:

1. A method for logical mirroring between an initiator node and a multi-tier target node, the method comprising
maintaining data having a probability above a threshold of being modified at a predetermined memory block at a first tier of the initiator node; wherein the threshold is based on one of a state modifying operation to modify the data at the initiator node, a file name extension and an access pattern to the data at the initiator node;
receiving at a first tier of the target node data that was modified at the initiator node;
based on management software instructions, retaining at the first tier of the target node a first subset of the data, the first subset comprising data having a probability above the threshold of being modified; wherein a predetermined memory block at the first tier of the target node corresponding to the predetermined memory block of the initiator node stores the data that was modified from the initiator node having the probability above the threshold of being modified;
moving to a second tier of the target node a second subset of the data, the second subset comprising data having a probability below the threshold of being modified; and
selectively copying from the initiator node to the first tier of the target node metadata and pointers of the data that was modified thereby obtaining a logical copy of the initiator node at the target node; wherein selectively copying pointers comprises copying a pointer to a location of the data on a second tier of the initiator node and not copying a pointer to a location of the data on the first tier of the initiator node.

2. The method of claim 1, comprising moving the second subset of data to the second tier of the target node when space is needed on the first tier of the target node.

3. The method of claim 1, wherein the management software is executed by a device external to the target node.

4. The method of claim 3, wherein the device external to the target node is the initiator node.

5. The method of claim 1, wherein the initiator node comprises multiple tiers managed by management software that is different than the management software managing the target node.

6. The method of claim 1, further comprising: maintaining a map at the target node to link data from the first tier and the second tier of the target node to locations at the second tier of the initiator node.

7. The method of claim 1 wherein selectively copying metadata comprises copying metadata that relates to the data and not copying metadata that relates to management of the initiator node.

8. A non-transitory, machine readable medium having stored thereon instructions comprising machine executable code which when executed by a machine, causes the machine to:
maintain data having a probability above a threshold of being modified at a predetermined memory block at a first tier of a initiator node; wherein the threshold is based on one of a state modifying operation to modify the data at the initiator node, a file name extension and an access pattern to the data at the initiator node;
receive at a first tier of a target node data that was modified at the initiator node;
based on management software instructions, retain at the first tier of the target node a first subset of the data, the first subset comprising data having a probability above the threshold of being modified; wherein a predetermined memory block at the first tier of the target node corresponding to the predetermined memory block of the initiator node stores the data that was modified from the initiator node having the probability above the threshold of being modified;
move to a second tier of the target node a second subset of the data, the second subset comprising data having a probability below the threshold of being modified; and
selectively copy from the initiator node to the first tier of the target node metadata and pointers of the data that was modified thereby obtaining a logical copy of the initiator node at the target node; wherein selectively copying pointers comprises copying a pointer to a location of the data on a second tier of the initiator node and not copying a pointer to a location of the data on the first tier of the initiator node.

9. The storage medium of claim 8, the machine executable code further causing the machine to: move the second subset of data to the second tier of the target node when space is needed on the first tier of the target node.

10. The storage medium of claim 8, wherein the management software is executed by a device external to the target node.

11. The storage medium of claim 10, wherein the device external to the target node is the initiator node.

12. The storage medium of claim 8, wherein the initiator node comprises multiple tiers managed by management software that is different than the management software managing the target node.

13. The storage medium of claim 8, the machine executable code further causing the machine: to maintain a map at the target node to link data from the first tier and the second tier of the target node to locations at the second tier of the initiator node.

14. The storage medium of claim 8, wherein selectively copying metadata comprises copying metadata that relates to the data and not copying metadata that relates to management of the initiator node.

15. A system, comprising:

a memory containing machine readable medium comprising machine executable code having stored thereon instructions; and a processor module coupled to the memory, configured to execute the machine executable code to:

maintain data having a probability above a threshold of being modified at a predetermined memory block at a first tier of a initiator node; wherein the threshold is based on one of a state modifying operation to modify the data at the initiator node, a file name extension and an access pattern to the data at the initiator node;

receive at a first tier of a target node data that was modified at the initiator node;

based on management software instructions, retain at the first tier of the target node a first subset of the data, the first subset comprising data having a probability above the threshold of being modified; wherein a predetermined memory block at the first tier of the target node corresponding to the predetermined memory block of the initiator node stores the data that was modified from the initiator node having the probability above the threshold of being modified;

move to a second tier of the target node a second subset of the data, the second subset comprising data having a probability below the threshold of being modified; and selectively copy from the initiator node to the first tier of the target node metadata and pointers of the data that was modified thereby obtaining a logical copy of the initiator node at the target node; wherein selectively copying pointers comprises copying a pointer to a location of the data on a second tier of the initiator node and not copying a pointer to a location of the data on the first tier of the initiator node.

16. The system of claim 15, the machine executable code further causing the machine to: move the second subset of data to the second tier of the target node when space is needed on the first tier of the target node.

17. The system of claim 15, wherein the management software is executed by a device external to the target node.

18. The system of claim 15, wherein the initiator node comprises multiple tiers managed by management software that is different than the management software managing the target node.

19. The system of claim 15, the machine executable code further causing the machine: to maintain a map at the target node to link data from the first tier and the second tier of the target node to locations at the second tier of the initiator node.

20. The system of claim 15, wherein selectively copying metadata comprises copying metadata that relates to the data and not copying metadata that relates to management of the initiator node.

* * * * *